United States Patent [19]

Messinger et al.

[11] Patent Number: 4,617,117
[45] Date of Patent: Oct. 14, 1986

[54] HOUSING ASSEMBLY WITH REMOVABLE JACKED COVER

[75] Inventors: Robert Messinger, Cranford; Samuel J. Tobias, Edison, both of N.J.

[73] Assignee: Hayward Pool Products, Inc., Elizabeth, N.J.

[21] Appl. No.: 632,759

[22] Filed: Jul. 20, 1984

[51] Int. Cl.⁴ .......................................... B01D 27/08
[52] U.S. Cl. ............................. 210/198.1; 210/232; 210/450
[58] Field of Search .................. 210/198.1, 232, 416.2, 210/443, 444, 445, 447, 450, 453, 416.1; 422/261, 255, 902

[56] References Cited

U.S. PATENT DOCUMENTS

| | | | |
|---|---|---|---|
| 2,218,800 | 10/1940 | Williams | 210/438 |
| 2,294,261 | 8/1942 | Wilkinson | 210/453 |
| 2,533,192 | 12/1950 | Kennedy | 210/450 |
| 2,568,181 | 9/1951 | Zimmerman et al. | 210/453 |
| 2,576,144 | 11/1951 | Rood | 210/453 |
| 2,584,551 | 2/1952 | Chambers et al. | 210/450 |
| 2,586,508 | 2/1952 | Brotman | 210/444 |
| 2,747,738 | 5/1956 | Johnson et al. | 210/130 |
| 2,874,846 | 2/1959 | Herster | 210/453 |
| 3,317,053 | 5/1967 | Dummler | 210/439 |
| 3,508,657 | 4/1970 | Cooper | 210/90 |
| 3,746,171 | 7/1973 | Thomsen | 210/444 |
| 4,108,775 | 8/1978 | Wilkes et al. | 210/453 |
| 4,172,798 | 10/1979 | Kronsbein | 210/446 |
| 4,303,515 | 12/1981 | Rademacher | 210/198.1 |
| 4,316,801 | 2/1982 | Cooper | 210/90 |

Primary Examiner—Richard V. Fisher
Assistant Examiner—Wanda L. Millard

[57] ABSTRACT

A housing assembly for pressurized fluids is provided, having a cover removably attached to the housing in a manner that allows jacking of the cover into and away from sealing engagement with the housing, comprising, in combination, a housing; a fluid chamber in the housing; a fluid inlet and a fluid outlet in the housing in fluid flow connection with the fluid chamber; and a removable cover assembly closing off an open end of the fluid chamber and comprising a cover movable into and out from sealing engagement with the housing; a jack ring removably attached to the housing and having a central aperture; and optionally, when the vessel is pressurized, also having a peripheral portion to the housing engaging a peripheral portion of the removable cover; and means attaching the movable cover axially to the jack ring at the central aperture in a manner such that the jack ring engages the cover at a central portion adjacent the central aperture of the jack ring, and optionally also at a peripheral portion adjacent the peripheral portion of the jack ring, and jacks the cover onto the housing into sealing engagement therewith by such engagement when the jack ring is being attached to the housing, and off from the housing out from sealing engagement therewith, by engagement through the attaching means at a central portion of the jack ring adjacent the central aperture thereof when the jack ring is being removed from the housing, and optionally also at a peripheral portion with the peripheral portion of the jack ring, so that the removable cover is jacked onto the housing and off from the housing by the jack ring, for access to the fluid chamber within the housing.

10 Claims, 3 Drawing Figures

HOUSING ASSEMBLY WITH REMOVABLE JACKED COVER

Housings for fluids commonly require a cover that is removably attached to the housing, to provide access to a fluid chamber in the housing. Such a cover has to be sealed to the housing in a fluid-tight seal that can if required withstand high internal fluid pressures, up to about 2000 psig or more. Such covers have to be constructed of heavy gauge material, and accordingly are heavy, and difficult to remove from the housing when such access is required. It is also difficult to attach them to the housing in a manner that makes it possible to obtain a fluid-tight seal that will withstand such high interior fluid pressures. This problem is commonly encountered in fluid pumps; in apparatus for treatment of pressurized fluids, such as filter assemblies, and chlorinators, and chemical reactors in which the reactions are carried out under high internal pressures.

In such filter assemblies with removable bowls used in industrial filtering operations. O-ring seals are not used, because they are very difficult to break, especially after being subjected to high pressures for a long period of time. Normally, compression seals or other gasket-type sealing members are provided between the cover and the housing, and between the housing sections and the filter element, to assist in preventing leakage, and make it possible to break the seal on disassembly.

Often, however, due to the tight engagement between the parts of the assembly and the expansion of the sealing members caused by the internal pressure of the system, it is extremely difficult to remove the cover from the housing. It is necessary to employ wrenches and hammers to break the tight seal between the housing and the cover. Such a procedure is time-consuming, and hard on the equipment. It can be extremely costly, if it is slow, since it is normally necessary to shut down the operation of the fluid system. Any delay can become a significant cost factor.

One solution to the problem of removing the cover from the housing is to provide a self-securing and self-removing coupling mechanism as a portion of the housing assembly. Such coupling mechanisms are normally provided with a handle or a lever to facilitate the coupling and uncoupling of the cover to the bowl portion. Filter assemblies having such coupling members are shown in U.S. Pat. Nos. 3,317,053 to Dummler; 2,218,800 to Williams; 2,533,192 to Kennedy and 2,747,738 to Johnson et al. These patents disclose filter assemblies in which a rotatable coupling handle is provided on the head portion or cover of the housing. The handles are adapted to both tighten the head or cover on the bowl when rotated in one direction and pull the head from the bowl when rotated in the opposite direction.

U.S. Pat. No. 3,508,657, patented Apr. 28, 1970, to Cooper provides a filter assembly adapted for use under extremely high pressures, of the order up to 2000 p.s.i., or more, with a coupling mechanism adapted to couple and remove the filter housing cover from the bowl portion in which the coupling mechanism is isolated from the fluid in the housing by an interior seal between the housing head and a support post in the bowl. Due to this construction, leakage from the assembly at or through the coupling mechanism cannot occur. Moreover, the operation of the coupling mechanism does not cause any significant wear of the sealing member since the coupling mechanism does not contact the sealing members and no rotational contact against the sealing members occurs.

U.S. Pat. No. 4,172,798 to Kronbein, patented Oct. 30, 1979, provides a filter housing which is said to be simple, robust and compact in construction, versatile in use and capable of being opened or closed rapidly to change the replaceable filter element. The filter housing also has favorable flow characteristics and complies with safety requirements fully.

The filter housing has a first part and a tapering second part, an inlet and an outlet, and is arranged, in use, to contain a replaceable filter element, the first and second parts having complementary frusto-conical mating surfaces and being connected together by a screw threaded ring which is screwed onto the outer face of the first part and which includes an internal flange engaging an external flange on the second part. Leakage is prevented by a gasket.

As seen in FIG. 1, the top part 1 and the bottom part 2 are held together by the screw threaded ring 3 which is screwed onto the top part 1. The screw threaded ring 3 includes an internal flange 12 and this engages an external flange 13 on the bottom part 2. The frusto-conical seating 11 extends downwards towards and buttresses the flange 13. It is apparent from the figure that the ring is not so attached to the second part as to apply leverage thereto in seperating the parts.

U.S. Pat. No. 4,316,801 patented Feb. 23, 1982, to Cooper, provides a filter assembly having a filter bowl assembly attached to a filter head in a manner that allows jacking of a filter cannister into and away from sealing engagement with the head, comprising, in combination, a filter head; an inlet for unfiltered fluid and an outlet for filtered fluid in the head; and a filter bowl assembly comprising a filter cannister; a filter element removably disposed in the filter cannister across the line of fluid flow from the inlet to the outlet so that fluid flow from the inlet to the outlet normally proceeds through the filter; a jack ring removably attached to the head; and means attaching the filter cannister to the jack ring in a manner to jack the cannister onto the head into sealing engagement therewith when the jack ring is attached to the head, and off from the head when the jack ring is removed from the head, so that the cannister is jacked onto the head and off from the head by the jack ring for access to and replacement of the filter element in the cannister.

These devices all have jack rings engaging only an outer peripheral portion of the attached member, i.e. the cover or bowl or cannister, and since the jack ring itself also engages the housing at its outer periphery, there can be no leverage forces applied to the member during attachment or removal of the ring. This means that a considerable force has to be applied to the ring, to move the member. It also means that no force can be applied in any other portion of the member, to aid in moving it.

In accordance with the present invention, a housing assembly for fluids is provided, having a cover removably attached to the housing in a manner that allows jacking of the cover into and away from sealing engagement with the housing, comprising, in combination, a housing; a fluid chamber in the housing; a fluid inlet and an fluid outlet in the housing in fluid flow connection with the fluid chamber; and a removable cover assembly closing off an open end of the fluid chamber and comprising a cover movable into and out from sealing engagement with the housing; a jack ring removably attached to the housing and having a central aperture; and optionally when the vessel is pressurized also having a peripheral portion engaging a peripheral portion of the removable cover; and means attaching the movable cover axially to the jack ring at the central aperture, in a manner such that the jack ring engages the cover at a central portion adjacent the central aperture of the jack ring, and optionally also at a peripheral portion adjacent the peripheral portion of the jack ring; and jacks the cover onto the housing into sealing engagement therewith by such engagement when the jack ring is being attached to the housing, and off from the housing out from sealing engagement therewith by engagement with a central portion of the jack ring adjacent the central aperture thereof, and optionally also at a peripheral portion with the peripheral portion of the jack ring, through the attaching means when the jack ring is being removed from the housing, so that the removable cover is jacked onto the housing and off from the housing by the jack ring, for access to the fluid chamber within the housing.

In a preferred embodiment of the invention, the jack ring is threadably attached to the outside of the housing, and is in the form of a cap or outer cover with a cylindrical peripheral flange outside of the removable cover, and embracing the periphery of the removable cover that is sealingly attached to the housing, and is jacked onto and off from the housing by the jack ring.

In a further preferred embodiment, the housing is provided with a detent locking the jack ring in the cover-closed position until released, to prevent accidental turning or removal of the cover.

Other modes of attachment of the jack ring to the housing can be employed. A translating bayonet-type joint on the jack ring, engaging with projections, flanges or pins on the housing, is quite satisfactory, so as to draw the jack ring securely against the housing, and with it the removable cover, into or out from the sealing engagement shown in the drawings.

In order to make it possible for the jack ring to jack the removable cover both onto the housing, into sealing engagement therewith, and off from the housing, away from sealing engagement therewith, when the jack ring is attached or removed, respectively, the removable cover must be held to the jack ring at the central aperture of the ring in a manner to permit rotation of the ring with respect to the cover, and to prevent any substantially relative axial movement of the cover and the ring during this operation. For this purpose, retaining means in the nature of pivot pins, stub axles, rivets, and inside bearing supports can be used. Such retaining means are well known to those skilled in this art, and form no part of the present invention.

A preferred embodiment for removable attachment thereof is the flanged retaining screw shown in the drawings, which is threadably attached to the removable cover in a threaded socket in a central boss of the cover, formed integral with the cover on the outside, so as to avoid providing a leakage path to the interior of the pressurized housing, and passes through the central aperture of the jack ring after the cover has been installed. The jack ring is held to the cover by the peripheral flange on the screw. Intermediate washers function as bearings to facilitate rotation of the jack ring on the boss. Other variations will be apparent to those skilled in the art.

Since the removable cover does not rotate with the jack ring, but is moved only axially, into and away from engagement with the housing, there is not rotation with respect to the seal between the cover and the housing, and therefore an O-ring seal or similar stationary sealing element can be used, without any of the difficulties previously encountered in making sealing connections of this type.

One way of providing for relative axial movement of the jack ring and removable cover at the central and also the peripheral portions thereof is to provide a flange on the cover, and a flange and/or retaining lock rings in a recess or groove on the jack ring on one or both sides of the cover flange. Another way is to shape the exterior periphery of the cover in an expanded or reduced diameter to match a corresponding recess or flange on the jack ring where it engages the jack ring. This expanded or reduced portion on the exterior periphery of the cover can be for example a flange, a groove, a ridge, or a bead. Similar expanded or reduced portions and lock rings can be provided at the central portion of the cover, and the inside wall of the jack ring at the central aperture. Such portions on the cover can be shaped to match corresponding expanded or reduced diameter portions or lock rings on the jack ring.

The jack ring and the cover can be permanently rotatably attached together by such a flange and mating groove construction.

Other variations will be apparent to those skilled in this art. As should now be apparent, it is important that the jack ring rotatably engage the cover both from above and from below at least at the central portion, but also optionally at the peripheral portions as well, so as to carry the cover with it, both into and away from sealing engagement with the housing, while the jack ring is being rotated during attachment to and withdrawal from the housing.

The exterior of the jack ring can be shaped for rotation manually, or by a tool, and can be ribbed, serrated, polygonal, or provided with an abrasive safety grip.

Preferred embodiments of the invention are illustrated in the drawings, in which.

Figure 1:
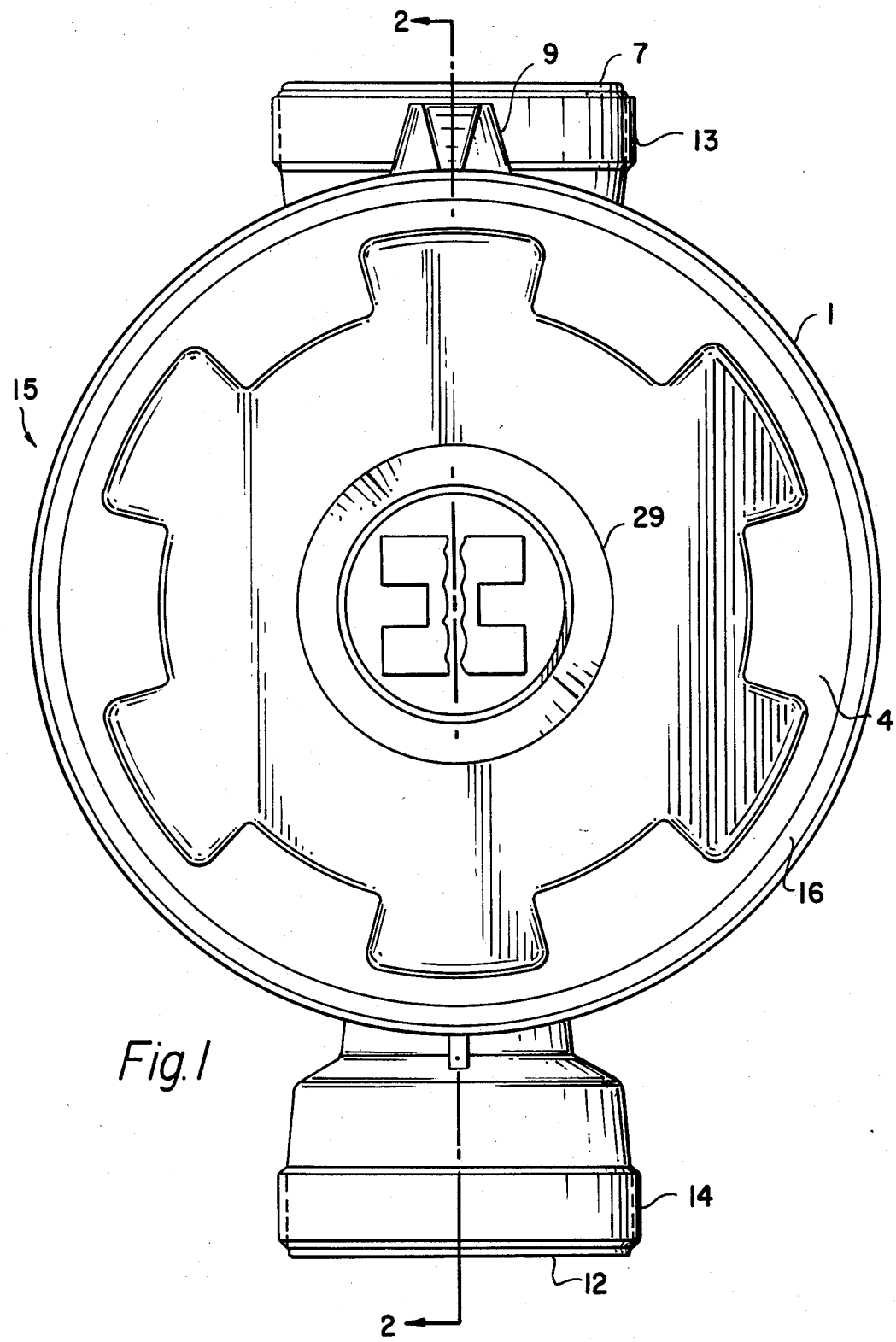
FIG. 1 is a top view of a chlorinator embodying the fluid housing and removable cover assembly of the invention.
Figure 2:
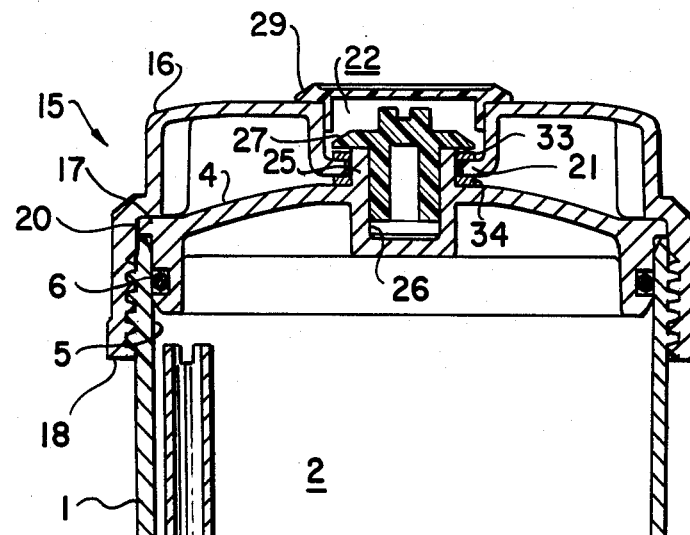
FIG. 2 is a longitudinal sectional-view, taken along the line 2—2 of the chlorinator of FIG. 1, and looking in the direction of the arrows.
Figure 2:
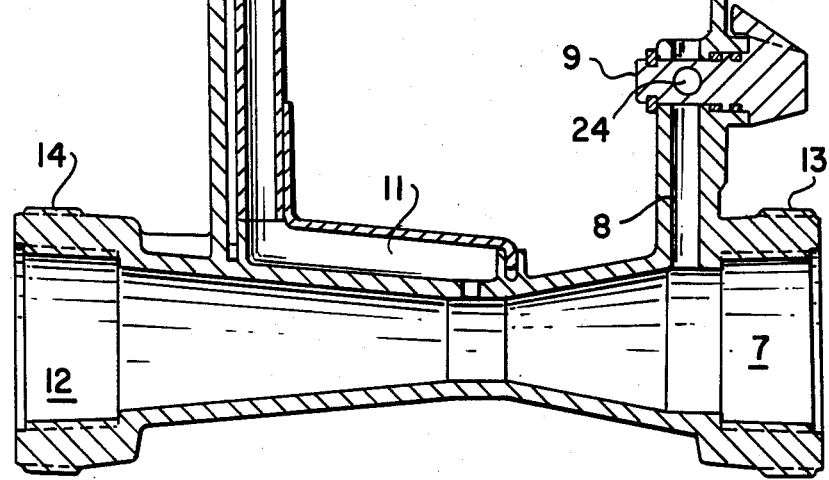

The chlorinator shown in FIGS. 1 and 2 includes a housing 1 having a central fluid chamber 2 open at the top end 3, and closed off by the removable cover 4 in sealing engagement with the inside wall 5 of the housing by the O-ring seal 6.

In the lower portion of the housing there is provided a fluid inlet 7 leading via the internal passage 8 past the shut-off valve 9 into the central fluid chamber 2. At one side of the fluid chamber there is an overflow outlet feeder tube 10 in fluid flow connection via passage 11 with the outlet port 12. Thus, fluid flow through the chlorinator proceeds via the inlet 7, the inlet passage 8, and valve 9 into the fluid chamber 2, and then by downflow to and through tube 10 and the outlet passage 11 through the outlet port 12. Both the inlet port 7 and the outlet port 12 are provided with fluid line connectors 13, 14 for attachment in-line to a system carrying pressurized fluid to be chlorinated, such as, for example, water from a swimming pool, which is circulated from the pool to the chlorinator, and then back to the pool, optionally by way of a filter (not shown) with the aid of the pump (not shown).

The removable cover 4 is a part of the removable cover assembly 15, which also includes a jack ring 16 in the form of an outside top cover embracing and enclosing the removable cover 4, with a peripheral cylindrical flange 18 threading onto exterior threads 19 of the housing 1, at the open end 3 of the chamber 2. The internal peripheral wall of the top cover, the jack ring, is formed with a ledge 17 engaging the peripheral flange 20 of the removable cover 4.

The central portion of the top cover 16 is formed with a central aperture 21 and inwardly extending walls defining a recess 22. The inner periphery of the aperture fits snugly but rotatably against the exterior wall of the central boss 25 extending outwardly from the central portion of the removable cover. This central boss defines a threaded internal socket 26 that receives the flanged retaining screw 27, as seen in FIG. 2. This screw has a top flange 28 projecting outwardly beyond the diameter of the boss. There is space on the boss beneath the screw for two plastics washers 33, 34 on each side of the top cover at the central aperture.

It is thus seen that the cover retaining screw 27 holds the top cover 16 rotatably on the boss 25 in the position shown against the cover 4, so that rotation of the top cover on the threads of the housing, either onto the housing or off from the housing, carries the removable cover axially with the top cover, which thus serves as a jack ring, for jacking the removable cover 4 both onto and off from the open end of the housing. While the removable cover 4 fits within the internal wall 5 of the housing 1 at the open end 3 in a snug fit, a leak-tight seal is provided by the O-ring seal 6.

It will now be apparent that when the top cover 16 is threaded onto the housing, it engages the removable cover 4 both at its central portion adjacent the central aperture of the ring, in the region of the boss 25 on the removable cover, and also at the external periphery thereof, at the ledge 17 of the top cover bearing against the flange 20. The jack ring thus carries the removable cover 4 into tight sealing engagement with the housing, closing off the fluid chamber when it has been fully threaded onto the housing. At this point, the internal peripheral wall of the top cover 16 is in close engagement with the end of the housing, which is shaped so as to match, and the ledge 17 holds the flange 20 of the removable cover in position against the end of the housing. The cover is loosely held in position so that no binding occurs between the cover and the jack ring.

When the removable cover is to be separated from the housing to gain access to the chamber 2, the top cover 16 is simply rotated off the housing. When this is done, the cover 16 engages the flange 28 of the cover retaining screw 27, and lifts the removable cover 4, up and away from the housing. When the chamber is to be sealed off again, the operation is repeated, in reverse order.

The shut-off valve 9 provided in the inlet passage 8 leading into the fluid chamber 2 makes it possible to close off fluid flow when the cover is to be removed. The valve is shown in the closed position and is movable manually by rotation 90° to the open position, by grasping the outer periphery, so that the through bore 24 is in alignment with the passage 8.

To improve the external appearance of the cover assembly 15, the recess 22 in which the cover retaining screw 27 is inserted can be closed off by a cap 29, a press-fitted into the recess. The cap desirably can carry identification or other indicia, such as the trademark of the manufacturer of the system.

While the orientation of the fluid housing shown in FIGS. 1 and 2 is vertical, for convenience of handling, since this permits access to the fluid chamber from the top, without spillage, as well as gravity-draining of the chamber through outlet 12 when valve 9 is closed and tube 10 removed, it is of course possible to orient the housing in any other desired plane, including horizontal. The removal and reattachment of the removable cover to the housing is exactly the same, whatever the orientation of the housing.

Figure 3:
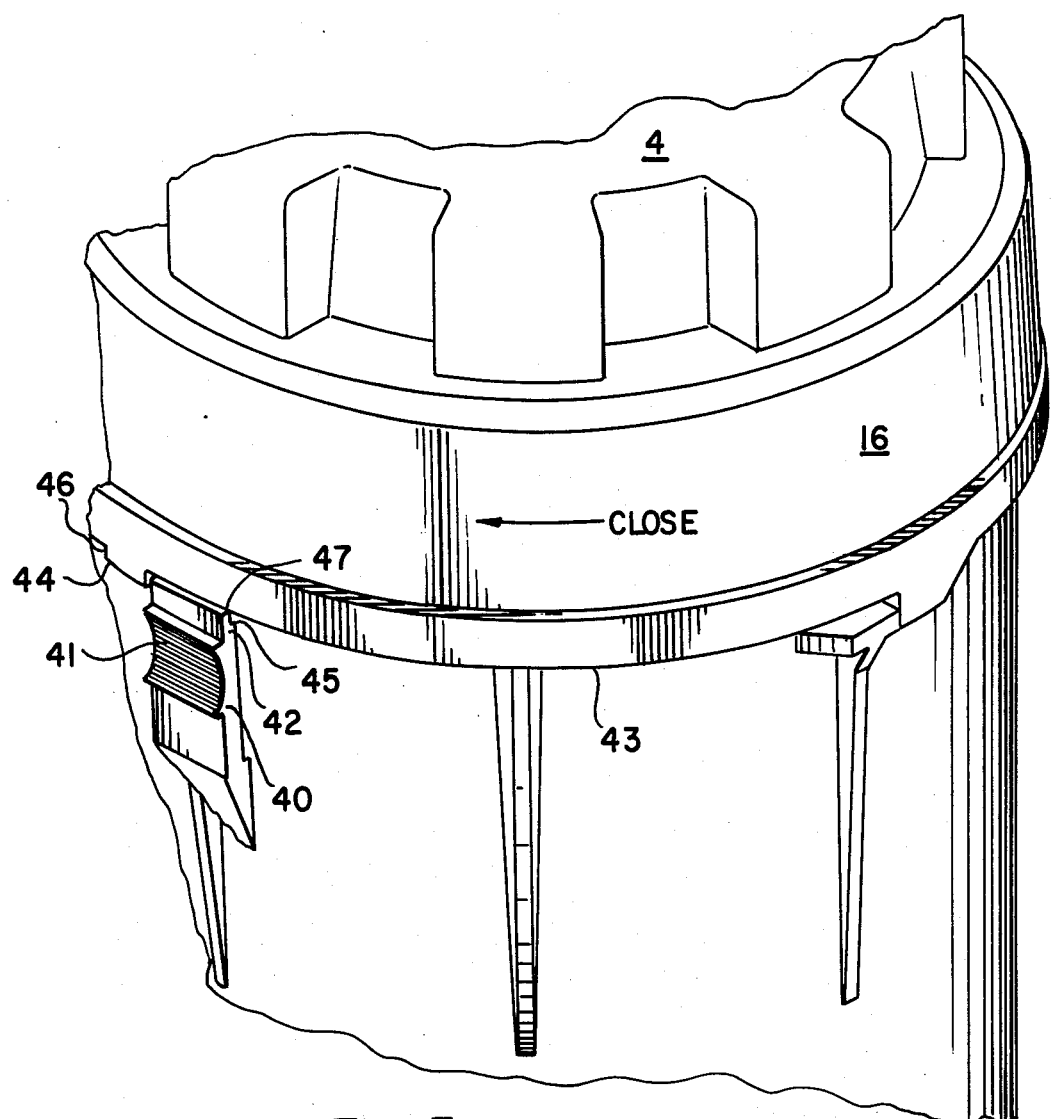
FIG. 3 is a view from one side of another embodiment of chlorinator, with a detent lock retaining the jack ring and cover in the closed position.

The embodiment of chlorinator tank shown in FIG. 3 is similar in every respect to that of FIGS. 1 and 2 except for the provision of a detent lock to hold the removable cover and jack ring in the closed position. Therefore, this description is limited to the detent lock, and like numbers are used for the other parts which are as described in connection with FIGS. 1 and 2.

As seen in FIG. 3, the detent 40 is a resilient plastic tab fixed to the outside of the housing with a finger recess 41 and a flat end 42 closely abutting the lower periphery 43 of the jack ring 16. The jack ring periphery 43 is formed with an integral projection 44 engaging the end 42 of the detent, which accordingly prevents rotation of the jack ring 16 in the opening direction, counterclockwise.

The end 42 of the detent is spaced a distance 45 from the housing 1 more than its thickness, and since the detent is resilient it can be pushed by a finger bearing on recess 41 inwardly sufficiently to clear this projection 44, which is spaced the same distance 45 from the housing. The ring 16 can then be rotated counterclockwise, clearing the detent, to remove the cover 4.

To lock the jack ring 16 and cover 4 in the closed position, one simply rotates the jack ring towards the closed position. The projection 44 is tapered to a point 46 at one side and this point clears the end 42. The tab depresses detent 40 sufficiently to permit the projection 44 to pass by and thus permit the jack ring to proceed into the locked position shown in FIG. 3. The other side 47 is squared off, and cannot pass by, but is blocked by tab 42 until depressed.

While the drawings show application of the invention to a chlorinator tank, it will be apparent that the jacking cover assembly shown can also be applied to pump chambers, filter assemblies (for access to the filter element in the filter chamber), chemical reactor tanks, and similar fluid apparatus.

Having regard to the foregoing disclosure the following is claimed as the patentable and inventive embodiments thereof:

1. A housing assembly for fluids having a cover removably attached to the housing in a manner that allows jacking of the cover into and away from sealing engagement with the housing, comprising, in combination, a housing; a fluid chamber in the housing; a fluid inlet and a fluid outlet in the housing in fluid flow connection with the fluid chamber; and a removable cover assembly closing off an open end of the fluid chamber and comprising a cover movable into and out from sealing engagement with the housing; a central boss extending outwardly from a central portion of the cover and having an external cylindrical wall defining a bearing surface; a jack ring removably attached to the housing and having a central aperture; the inner periphery of the aperture rotatably embracing the bearing surface of the external wall of the boss; flanged jack ring retaining means attached to the central boss and extending over the jack ring abutting the central aperture thereof and attaching the removable cover axially above and below at each side of the jack ring at the central aperture, attaching the removable cover for axial movement with the jack ring, in a manner such that the jack ring engages the cover at a central portion adjacent the central aperture of the jack ring, and with axial movement thereof jacks the cover onto the housing into sealing engagement therewith by such engagement when the jack ring is being attached to the housing, and off from the housing out from sealing engagement therewith by engagement with the flanged jack ring retaining means and with a central portion of the jack ring adjacent the central aperture thereof when the jack ring is being removed from the housing, so that the removable cover is jacked onto the housing and off from the housing by the jack ring, for access to the fluid chamber within the housing.

2. A housing assembly according to claim 1 in which the removable cover has a peripheral portion and the jack ring also has a peripheral portion engaging the peripheral portion of the removable cover.

3. A housing assembly according to claim 1 in which the jack ring comprises an outer cap enclosing and embracing the removable cover.

4. A housing assembly according to claim 3 in which the flanged jack ring retaining means attaches the cap to the removable cover and is a flanged screw threaded into a socket in the removable cover.

5. A housing assembly according to claim 3 in which the cap and removable cover are each dome-shaped.

6. A housing assembly according to claim 1 having sealing means providing a leak-tight seal disposed between the removable cover and the housing.

7. A housing assembly accordng to claim 6 in which the sealing means is an O-ring.

8. A housing assembly according to claim 1 in which the jack ring is threadably attached to the housing.

9. A housing assembly according to claim 1 in which the housing has fixedly attached thereto a detent engaging a projection on the jack ring to lock the jack ring in the closed position of the cover.

10. A chlorinator comprising a chlorinator tank including a housing assembly according to claim 1.

* * * * *